United States Patent
Ye et al.

(10) Patent No.: US 12,402,148 B2
(45) Date of Patent: Aug. 26, 2025

(54) FEEDBACK FOR MULTI-CARRIER SIDELINK COMMUNICATION

(71) Applicant: Apple Inc., Cupertino, CA (US)

(72) Inventors: Chunxuan Ye, San Diego, CA (US); Dawei Zhang, Saratoga, CA (US); Wei Zeng, San Diego, CA (US); Haitong Sun, Irvine, CA (US); Hong He, Cupertino, CA (US); Sigen Ye, Whitehouse Station, NJ (US); Weidong Yang, San Diego, CA (US); Oghenekome Oteri, San Diego, CA (US); Zhibin Wu, Los Altos, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 654 days.

(21) Appl. No.: 17/439,295

(22) PCT Filed: Jun. 2, 2021

(86) PCT No.: PCT/CN2021/097889
§ 371 (c)(1),
(2) Date: Sep. 14, 2021

(87) PCT Pub. No.: WO2022/252144
PCT Pub. Date: Dec. 8, 2022

(65) Prior Publication Data
US 2023/0269754 A1    Aug. 24, 2023

(51) Int. Cl.
*H04W 72/25* (2023.01)
*H04L 1/1812* (2023.01)
(Continued)

(52) U.S. Cl.
CPC ........... *H04W 72/25* (2023.01); *H04L 1/1812* (2013.01); *H04L 1/1854* (2013.01); *H04L 1/1887* (2013.01); *H04W 72/563* (2023.01)

(58) Field of Classification Search
CPC .. H04W 72/25; H04W 72/563; H04L 1/1812; H04L 1/1854; H04L 1/1887;
(Continued)

(56) References Cited

U.S. PATENT DOCUMENTS

| 2012/0039252 A1 | 2/2012 | Damnjanovic |
| 2020/0022175 A1 | 1/2020 | Xiong et al. |

(Continued)

FOREIGN PATENT DOCUMENTS

| CN | 107005383 A | 1/2017 |
| CN | 111800219   | 10/2020 |

(Continued)

OTHER PUBLICATIONS

International Search Report and Written Opinion for PCT/CN2021/097889; 9 pages; Mar. 2, 2022.
(Continued)

*Primary Examiner* — Abdullahi E Salad
(74) *Attorney, Agent, or Firm* — Kowert, Hood, Munyon, Rankin & Goetzel, P.C.

(57) ABSTRACT

In sidelink carrier aggregation, a first user equipment (UE) transmits data packets to a second UE using a plurality of carriers. The second UE transmits Hybrid Automatic Repeat Request (HARQ) ACK/NACK information for the data packets to the first UE via one or more Physical Sidelink Feedback Channels (PSFCHs). The aggregated carriers may be constrained to have the same PSFCH configuration, or not. Resource selection for PSSCH transmission may be performed by considering scheduled PSFCH so as to conform to transmit capability limitations and/or a half-duplex limitation of the first UE and/or the second UE. The PSFCH may be transmitted on a single carrier of said plurality, but include joint HARQ feedback for each of the carriers. Furthermore, HARQ feedback may be transmitted on a
(Continued)

Physical Sidelink Shared Channel (PSSCHs), being signaled by the receive UE (i.e., the UE that transmits the feedback) via sidelink control information (SCI).

20 Claims, 14 Drawing Sheets

(51) Int. Cl.
  *H04L 1/1829* (2023.01)
  *H04L 1/1867* (2023.01)
  *H04W 72/563* (2023.01)

(58) Field of Classification Search
  CPC ..... H04L 5/0064; H04L 5/0055; H04L 5/001; H04L 5/0094; H04L 5/0007; H04L 1/00
  See application file for complete search history.

(56) References Cited

U.S. PATENT DOCUMENTS

| | | | |
|---|---|---|---|
| 2021/0050950 A1* | 2/2021 | Zhou | H04W 72/21 |
| 2021/0050953 A1 | 2/2021 | Park | |
| 2022/0225278 A1* | 7/2022 | Wang | H04W 72/0446 |
| 2022/0376761 A1* | 11/2022 | Lee | H04L 5/0057 |
| 2023/0300857 A1* | 9/2023 | Deng | H04L 5/0094 |
| | | | 370/329 |
| 2023/0327838 A1* | 10/2023 | Fan | H04L 1/1812 |
| | | | 370/329 |
| 2024/0049264 A1* | 2/2024 | Zhao | H04W 72/0453 |

FOREIGN PATENT DOCUMENTS

| | | |
|---|---|---|
| CN | 111800244 A | 10/2020 |
| CN | 112671521 | 4/2021 |
| CN | 112740612 A | 4/2021 |
| WO | 2020180032 | 9/2020 |
| WO | 2021018096 | 2/2021 |

OTHER PUBLICATIONS

Extended European Search Report for EP Patent Application No. 21895912.0; 9 pages; Oct. 6, 2022.
Office Action for CN 202180006934.4; Mar. 25, 2025.

* cited by examiner

800

| determine a set of two or more carriers on which to perform sidelink carrier aggregation, wherein the set is determined so that all of the two or more carriers in the set have the same Physical Sidelink Feedback Channel (PSFCH) configuration 810 |

1400 transmit joint HARQ feedback for a plurality of carriers on a Physical Sidelink Feedback Channel (PSFCH) in a selected carrier of the plurality of carriers    1410

1500 transmit Hybrid Automatic Repeat Request (HARQ) feedback on a Physical Sidelink Shared Channel (PSSCH)    1510

FEEDBACK FOR MULTI-CARRIER SIDELINK COMMUNICATION

PRIORITY CLAIM INFORMATION

This application is a U.S. national stage application of International Application No. PCT/CN2021/097889, filed on Jun. 2, 2021, titled "Feedback for Multi-Carrier Sidelink Communication", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to the field of wireless communication, and more particularly, to mechanisms to support the transmission of Hybrid Automatic Repeat Request (HARQ) feedback from a one wireless device to another wireless device in the context of sidelink carrier aggregation.

DESCRIPTION OF THE RELATED ART

In addition to uplink and downlink communication with a network, a user equipment (UE) device may communicate directly with one or more other UE devices. Such communication with other UE(s) is referred to as sidelink communication, or device-to-device (D2D) communication. A first UE may transmit data packets to a second UE via a sidelink carrier, and receive HARQ feedback from the second UE. The HARQ feedback indicates whether the transmitted data packets were successfully received by the second UE.

SUMMARY

In some embodiments, apparatus may include processing circuitry, where the processing circuitry is configured to cause a user equipment (UE) device to determine a set of two or more carriers on which to perform sidelink carrier aggregation, wherein the set is determined so that all of the two or more carriers in the set have the same Physical Sidelink Feedback Channel (PSFCH) configuration. In some embodiments, the apparatus is the user equipment device.

In some embodiments, the PSFCH configuration may include a PSFCH periodicity and a PSFCH slot offset. (The network may provide resource pool configuration information for each potential carrier. The resource pool configuration may include the periodicity of PSFCH resources, etc. Alternatively, the resource pool configuration may also be pre-configured, without network involvement.)

In some embodiments, said determining may include excluding a candidate carrier from the set in response to determining that the candidate carrier has a PSFCH configuration different from the PSFCH configuration of a first carrier included in the set.

In some embodiments, the processing circuitry may be further configured to cause the UE device to: in response to receiving data packets on the two or more carriers of the set, transmit two or more PSFCHs via the two or more carriers of said set, wherein the two or more PSFCHs include Hybrid Automatic Repeat Request (HARQ) feedback for the data packets received on the two or more carriers.

In some embodiments, the processing circuitry may be further configured to cause the UE device to: in response to transmitting data packets on the two or more carriers of the set, receive two or more PSFCHs via the two or more carriers of said set, wherein the two or more PSFCHs include Hybrid Automatic Repeat Request (HARQ) feedback for the data packets transmitted on the two or more carriers.

In some embodiments, an apparatus may include processing circuitry, where the processing circuitry is configured to cause a user equipment (UE) device to select a set of Physical Sidelink Shared Channel (PSSCH) resources on a given carrier of a plurality of carriers that are to be used for sidelink carrier aggregation, where said selecting considers one or more Physical Sidelink Feedback Channels (PSFCHs) on one or more other carriers of the plurality of carriers.

In some embodiments, said selecting may include excluding from the set a slot of the given carrier in response to a determination that using that slot would exceed a transmit capability limitation of the UE device under an existing resource reservation on the one or more other carriers.

In some embodiments, said selecting may include excluding from the set a slot of the given carrier in response to a determination that using that slot would violate a half duplex constraint of the UE device.

In some embodiments, said selecting may include: performing independent resource selection per carrier to initialize the set; and performing resource re-selection one or more times on the set to resolve violations of a transmit capability limitation or a half duplex constraint.

In some embodiments, an apparatus may include processing circuitry, where the processing circuitry is configured to cause a user equipment (UE) to transmit joint HARQ feedback for a plurality of carriers on a Physical Sidelink Feedback Channel (PSFCH) in a selected carrier of the plurality of carriers.

In some embodiments, the selected carrier may be a pre-determined one of the carriers of said plurality.

In some embodiments, the processing circuitry may be configured to cause the UE to transmit sidelink control information (SCI) in a first of the carriers, wherein the SCI includes a dynamic indication of whether the first carrier is the selected carrier that includes the joint HARQ feedback.

In some embodiments, herein the processing circuitry may be configured to cause the UE to transmit sidelink control information (SCI) including a dynamic indication of the selected carrier that is to carry the joint HARQ feedback.

In some embodiments, the selected carrier that carries the joint HARQ feedback may be the carrier of said plurality that has the highest priority according to a priority defined as part of the resource pool configuration.

In some embodiments, the selected carrier that carries the joint HARQ feedback may be determined by the UE device and a second UE device as part of a configuration process conducted via a sidelink interface.

In some embodiments, the joint HARQ feedback may be encoded (or represented) by choice of a cyclic shift for the PSFCH.

In some embodiments, the joint HARQ feedback may be transmitted using a HARQ-ACK codebook.

In some embodiments, the HARQ-ACK codebook may be a semi-statically configured codebook, wherein bits of the joint HARQ feedback are ordered according to a rule that uses slot first and carrier index second.

In some embodiments, the HARQ-ACK codebook may be a semi-statically configured codebook, wherein bits of the joint HARQ feedback are ordered according to a rule that uses carrier index first and slot second.

In some embodiments, the processing circuitry may be configured to cause the user equipment (UE) to transmit sidelink control information (SCI) that dynamically indicates the selected carrier that is to carry the joint HARQ feedback.

In some embodiments, the joint HARQ feedback may include more than 2 payload bits, wherein the PSFCH uses the channel design of PUCCH format 2. (PUCCH is an acronym for Physical Uplink Control Channel.)

In some embodiments, a time gap between PSFCH and Physical Sidelink Control Channel (PSCCH) and/or Physical Sidelink Shared Channel (PSSCH) may be configured per resource pool.

In some embodiments, the PSFCH may be transmitted in the last two symbols of a slot.

In some embodiments, the PSFCH may be frequency domain multiplexed with a second PSFCH, wherein the second PSFCH is of PSFCH format 0.

In some embodiments, the PSFCH may occupy a plurality of consecutive resource blocks in the frequency domain.

In some embodiments, frequency domain resources used for transmissions of PSFCHs may be configured per resource pool.

In some embodiments, a frequency domain resource and/or a code domain resource used for transmission of the PSFCH may be determined based at least on a resource location of a corresponding PSCCH or a corresponding PSSCH.

In some embodiments, the PSFCH may be scrambled with a scrambling sequence whose initialization value depends on a source ID and/or a destination ID.

In some embodiments, a priority of the PSFCH relative to uplink transmission and/or SL communication may be determined based on a highest of priorities of data blocks whose feedback bits are included in the joint HARQ feedback.

In some embodiments, an apparatus may include processing circuitry, wherein the processing circuitry is configured to cause a user equipment (UE) to transmit HARQ feedback on a Physical Sidelink Shared Channel (PSSCH). The PSSCH is a channel on which data (e.g., user data) is transmitted.

In some embodiments, the processing circuitry may be configured to cause the UE to transmit sidelink control information (SCI) corresponding to the PSSCH, wherein the SCI includes an offset field, wherein the offset field indicates resources of the PSSCH, used to carry the HARQ feedback.

In some embodiments, the SCI may be stage 1 SCI or stage 2 SCI.

In some embodiments, said transmission of the HARQ feedback on the PSSCH may be performed in response to a determination that the UE device has sidelink data to send to a second UE whose one or more transmissions caused generation of the HARQ feedback.

In some embodiments, said transmission of the HARQ feedback on the PSSCH may be performed in response to an instruction received from a transmit UE.

In some embodiments, said transmission of the HARQ feedback on the PSSCH may be performed in response to a determination that a payload size of the HARQ feedback is greater than a configured threshold.

In some embodiments, a non-transitory memory medium may store program instructions. The program instructions, when executed by processing circuitry, may cause the processing circuitry to perform any of the method embodiments described above.

In some embodiments, a user equipment (UE) device may include a radio subsystem; processing circuitry coupled to the radio subsystem; and memory storing program instructions. The program instructions, when executed by the processing circuitry, may cause the UE device to perform any of the method embodiments described above.

In some embodiments, a non-transitory memory medium may store program instructions. The program instructions, when executed by processing circuitry, may cause the processing circuitry to perform any of the method embodiments described above.

In some embodiments, a base station may include a radio subsystem; processing circuitry coupled to the radio subsystem; and memory storing program instructions. The program instructions, when executed by the processing circuitry, may cause the base station to perform any of the method embodiments described above.

BRIEF DESCRIPTION OF THE DRAWINGS

A better understanding of the present subject matter can be obtained when the following detailed description of the preferred embodiment is considered in conjunction with the following drawings.

FIG. 8B illustrates a method for determining a set of carriers on which to perform carrier aggregation, according to some embodiments.

Figure 1:
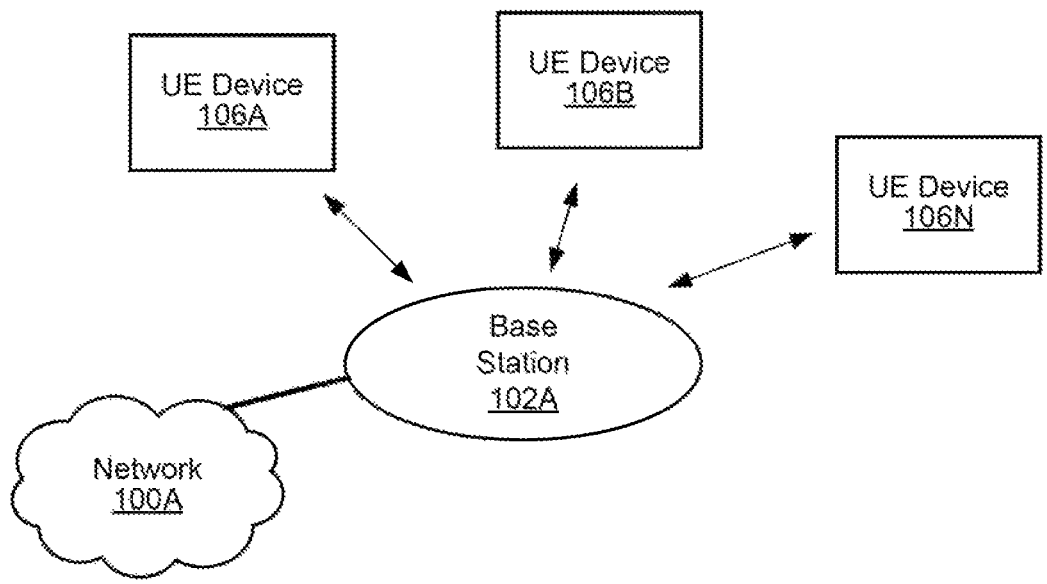
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
ACK: Acknowledgement
BM: Beam Management
BW: Bandwidth
BWP: Bandwidth Part
CA: Carrier Aggregation
CC: Component Carrier
CSI: Channel State Information
CSI-RS: CSI Reference Signal
DCI: Downlink Control Information
DL: Downlink
DRB: Data Radio Bearer
eNB (or eNodeB): Evolved Node B, i.e., the base station of 3GPP LTE
EN-DC: E-UTRA NR Dual Connectivity
E-UTRA: Evolved Universal Terrestrial Radio Access
FR n: Frequency Range n
gNB (or gNodeB): next Generation NodeB, i.e., the base station of 5G NR
GSM: Global System for Mobile Communications
HARQ: Hybrid Automatic Repeat Request
LTE: Long Term Evolution
LTE-A: LTE-Advanced
MAC: Medium Access Control
MAC-CE: MAC Control Element
MCS: Modulation & Coding Scheme
MIMO: Multiple-Input Multiple-Output
NACK: Negative Acknowledgement
NR: New Radio
NR-DC: NR Dual Connectivity
NSA: Non-Standalone
NW: Network
PBCH: Physical Broadcast Channel
PDCCH: Physical Downlink Control Channel
PDCP: Packet Data Convergence Protocol
PDU: Protocol Data Unit
PDSCH: Physical Downlink Shared Channel
PRB: Physical Resource Block
QAM: Quadrature Amplitude Modulation
RAN: Radio Access Network
RAT: Radio Access Technology
RLC: Radio Link Control
RLM: Radio Link Monitoring
RNTI: Radio Network Temporary Identifier
RRC: Radio Resource Control
RRM: Radio Resource Management
RS: Reference Signal
RTT: Round Trip Time
SCI: Sidelink Control Information
SCS: Subcarrier Spacing
SN: Sequence Number
SR: Scheduling Request
SSB: Synchronization Signal/PBCH Block
TB: Transport Block
UE: User Equipment
UL: Uplink
UMTS: Universal Mobile Telecommunications System
V2X: Vehicle to Everything Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
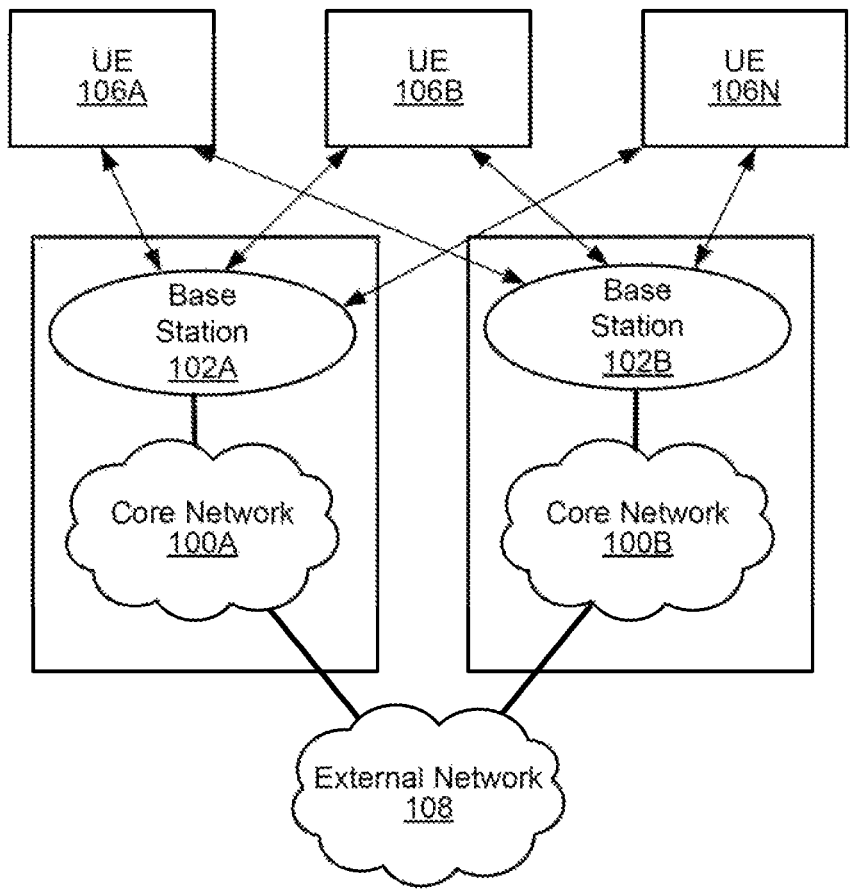
Figure 3:
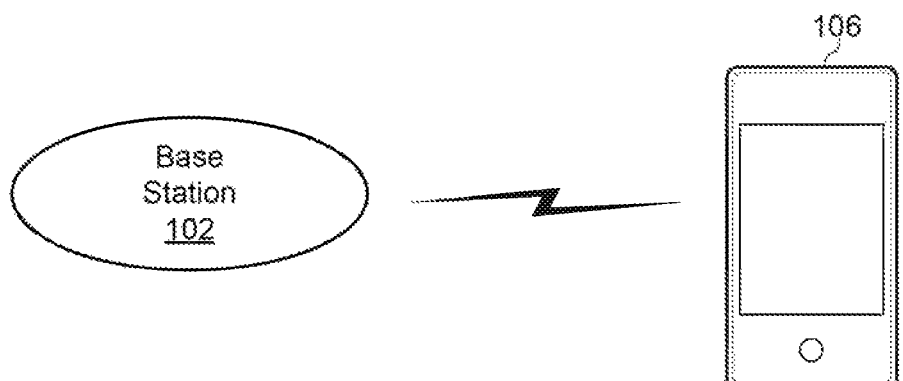
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1xRTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1xRTT, 1xEV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
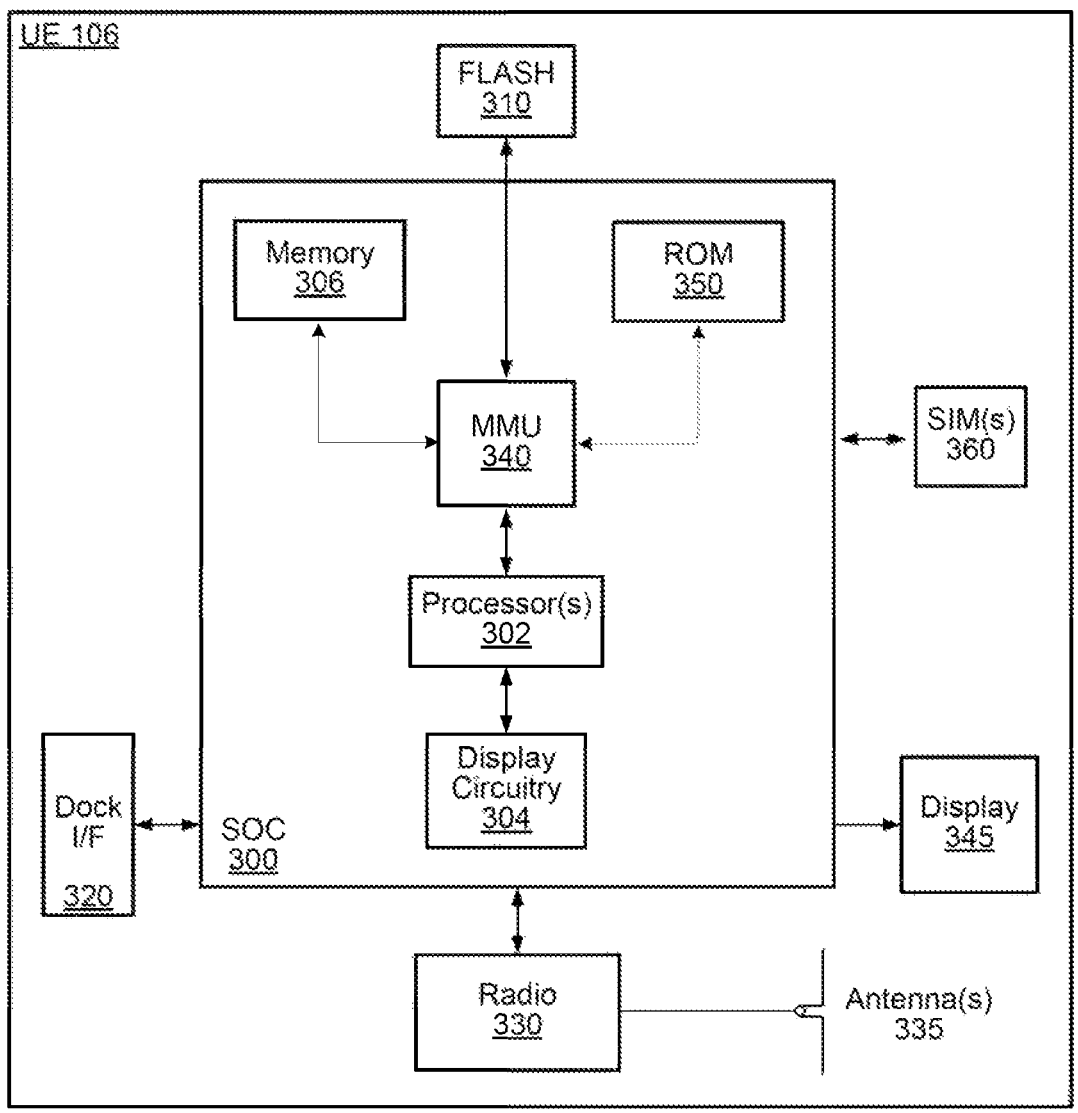
FIG. 4 illustrates an example of a block diagram of a user equipment (UE) device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
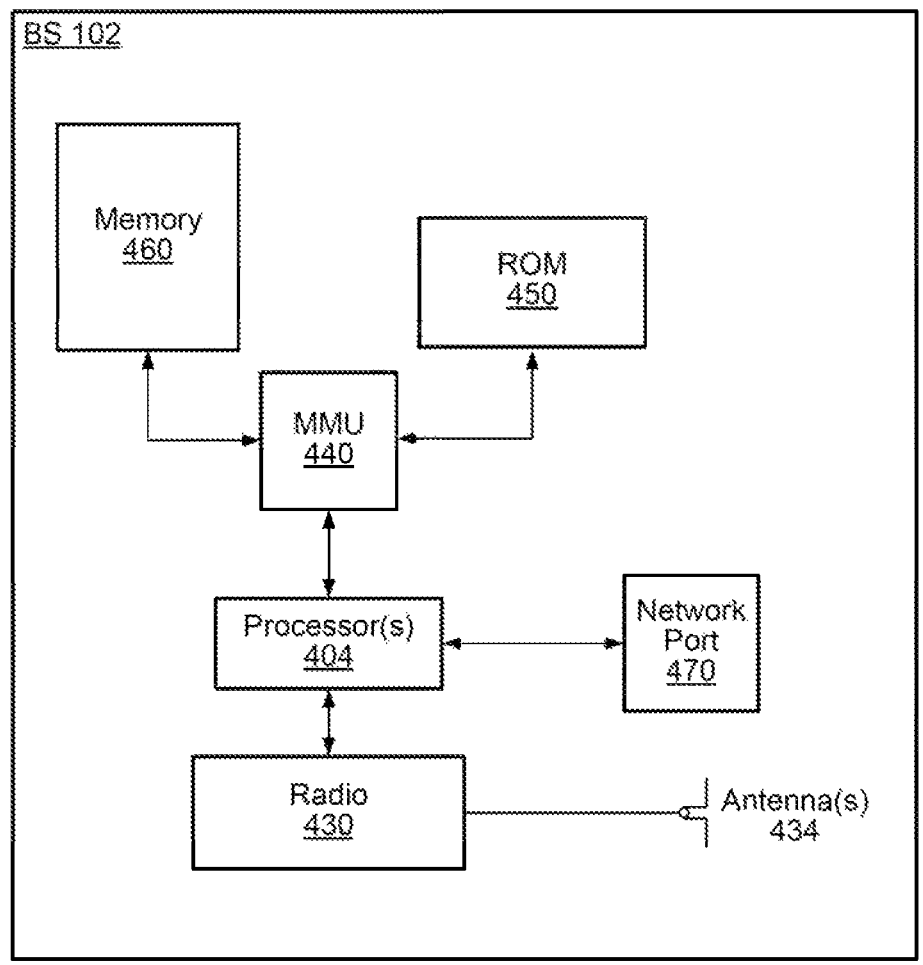
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MEMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor may be configured to operate according to one or more wireless telecommunication standards, including, but not limited to, GSM, LTE, 5G New Radio, WCDMA, CDMA2000, etc.

The processor(s) 404 of the base station 102 may be configured to implement any of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
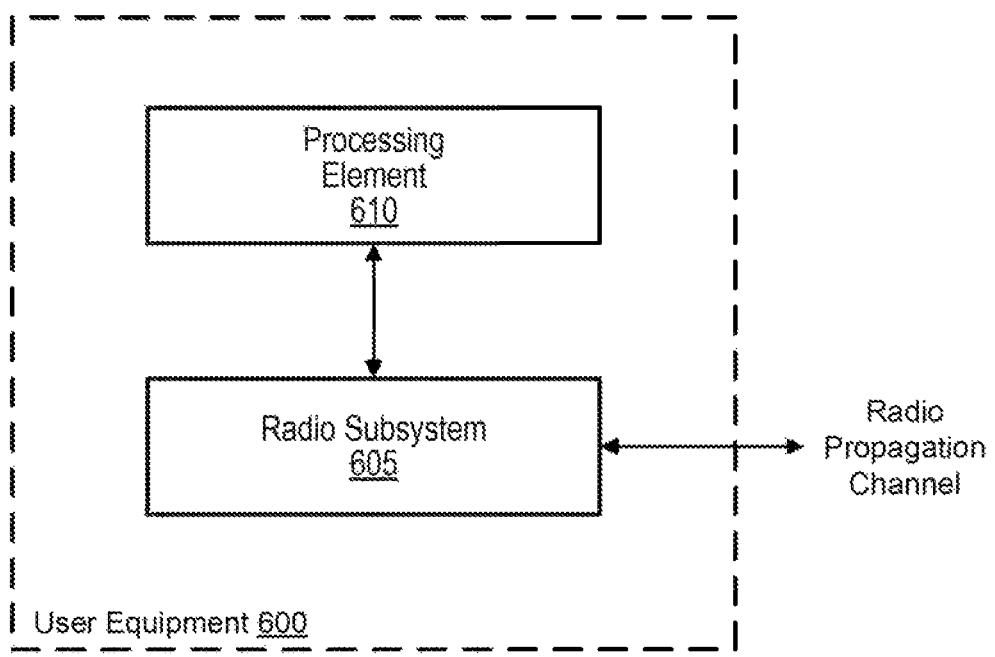
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or, one or more arrays of antennas) to facilitate signal transmission and reception. Each RF chain (or, some of the RF chains) may be tunable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem. The processing element may be configured to perform any of the UE-based method embodiments described herein.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
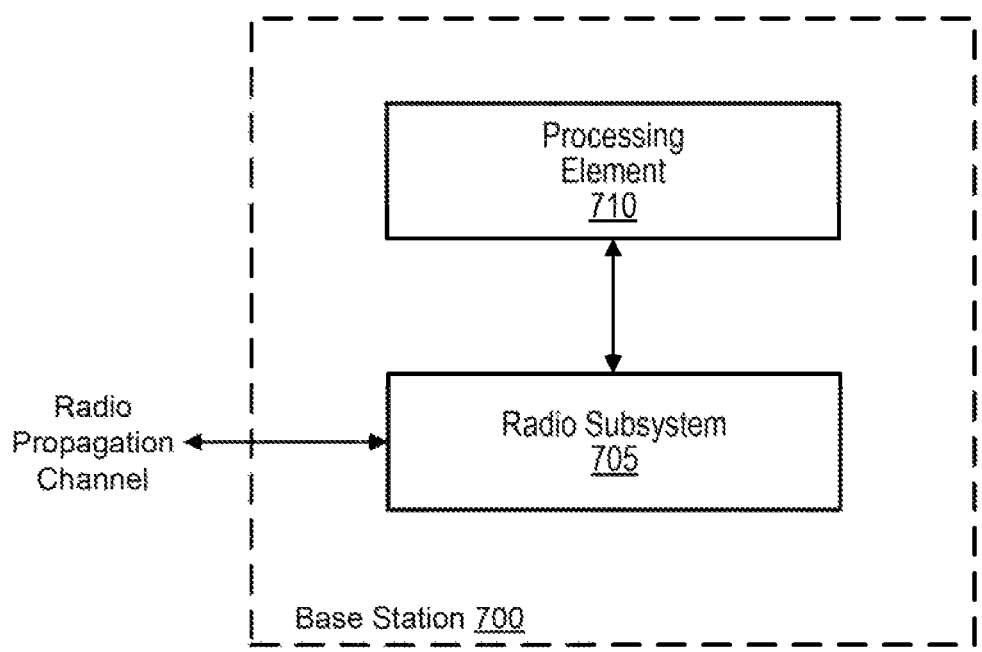
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 705 may include one or more RF chains. Each RF chain may be tunable to a desired frequency, thus allowing the RF chain to receive or transmit at different frequencies at different times. The radio subsystem 705 may be coupled to an antenna subsystem, including one or more antennas, e.g., an array of antennas, or a plurality of antenna arrays. The radio subsystem may employ the antenna subsystem to transmit and receive radio signals to/from radio wave propagation medium.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

Sidelink Feedback for Multi-Carrier Operation

In some embodiments, multicarrier communication (i.e., communication using more than one carrier) is performed in the context of Long Term Evolution—Vehicle to Everything (LTE V2X). (However, the principles of the present invention are not limited to the context of LTE V2X. A wide variety of other contexts are contemplated.) To support such multicarrier communication, various mechanisms may be provided with respect to processes such as carrier selection, synchronization carriers, SLSS transmissions, and resource selection. SLSS is an acronym for Side link Synchronization Signal.

Carrier Selection

With respect to carrier selection, a higher layer (e.g., the Radio Resource Control layer) of a UE's protocol stack may semi-statically provide potential carrier(s) for transmit and receive carrier aggregation (CA).

For a given MAC PDU, a single carrier may be provided (e.g., indicated) by the higher layer for transmission of the MAC PDU. MAC is an acronym for Medium Access Control. PDU is an acronym for Protocol Data Unit. Thus, a MAC PDU is a PDU of the MAC protocol layer.

From the perspective of the radio access network (RAN) physical layer, one or more of the following factors may be taken into account for the UE's TX carrier selection. (TX is an acronym for "Transmit".) For example, the UE may take into account the channel busy ratio (CBR). As another example, the UE may take into account UE capability information such as: the number of UE TX chains; implementation related aspects such as power budget sharing capability; TX chain retuning capability; or any combination of the foregoing.

In some embodiments, for a given MAC PDU, a single carrier may be used for transmission and potential retransmission of this MAC PDU.

In some embodiments, once a carrier is selected, the same carrier may be used for all MAC PDUs of the same sidelink process at least until resource re-selection is triggered for that same sidelink process.

In some embodiments, if there is a time overlap in a TTI (or subframe) and the UE is not able to transmit simultaneously on multiple carriers due to a limitation in available power, then the UE may prioritize transmission on higher priority packets. (TTI is an acronym for Transmission Time Interval. A time overlap is said to occur, e.g., when two data packets are ready for transmission on two respective carriers in the same TTI (or same subframe).)

In some embodiments, if there is overlap in one TTI of equal priority packets in different carriers, then the decision on which packet to transmit may be left to UE implementation if the UE is constrained in terms of available power.

In some embodiments, in case of a conflict of a sidelink transmission with uplink transmission, 3GPP Release 14 rules may be used to resolve the conflict.

Synchronization Carriers

In some embodiments, multicarrier operation in the context of LTE V2X may involve the use of one or more synchronization carriers.

In some embodiments, from the transmitting UE perspective, a single synchronization reference may be used for all aggregated carriers (or a subset of the aggregated carriers). When a UE transmits multiple MAC PDUs on multiple carriers, timing on all transmission carriers may be aligned.

In some embodiments, from the receiving UE perspective, a single synchronization reference may be used for reception of all aggregated carriers (or a subset of the aggregated carriers). This does not preclude the UE monitoring different synchronization sources on the different carriers.

In some embodiments, higher layers may configure a set (referred to as "Set-A") of one or more carriers that can potentially be used as the synchronization carrier for the potential carriers configured for TX and/or RX carrier aggregation (CA). (RX is an acronym for "Receive".)

In some embodiments, if Set-A is empty, independent synchronization may be used per carrier. The radio access network (RAN) physical layer may assume that carriers can only be aggregated in this case of Set-A being empty if they use the same synchronization reference (e.g. a GNSS-based reference, or the same eNodeB). GNSS stands for Global Navigation Satellite System. GNSS is a generic term for satellite-based navigation systems that provide geo-spatial positioning.

In some embodiments, Set-A is required to be a subset of the set of potential carriers configured for TX and RX CA. If Set-A is non-empty, the UE may determine the available set (Set-B) of synchronization carriers as a subset of Set-A, based on the carriers which the UE is currently aggregating.

In some embodiments, if no potential synchronization carrier is present in Set-B, independent synchronization per carrier may be assumed.

In some embodiments, if only one potential synchronization carrier is present in Set-B, the UE may derive the time and frequency (e.g., time and frequency synchronization) of all the aggregated carriers from the synchronization reference of that one synchronization carrier.

In some embodiments, if two or more potential synchronization carriers are present in Set-B, the UE may select the carrier in Set-B with highest Release-14 synchronization reference priority. After a synchronization carrier has been selected, the UE may refrain from performing carrier reselection unless synchronization is lost.

In some embodiments, a UE may assume that the configuration for synchronization reference priority is the same across all the aggregated carriers in carrier aggregation (CA).

In some embodiments, the radio access network (RAN) physical layer may assume that the direct frame number (DFN) value is common to all aggregated carriers. In sidelink communication, DFN is analogous to the System Frame Number (SFN) of downlink communication.

In some embodiments, the RANI may assume that the DFN offset value is common to all aggregated carriers from a UE point of view. The DFN is a frame number used in sidelink communication. (While it is possible that each carrier has its own DFN in the time domain, in the present embodiments it is assumed that the DFN number is the same on all aggregated carriers.)

SLSS Transmissions

In some embodiments, multi-carrier operation in the context of LTE V2X may involve SLSS transmissions. (SLSS is an acronym for sidelink synchronization signal. The term "multi-carrier operation" is interpreted herein as "operating using two or more carriers".)

In some embodiments, a UE may assume that the number and location of SLSS resources is the same in all the aggregated carriers (or a subset of the aggregated carriers).

In some embodiments, a UE may configure a non-synchronization carrier by defining the location of the SLSS resources on that carrier, and configuring the UE to not transmit SLSS on that carrier.

In some embodiments, the UE may be configured to employ one of the following options.

As a first option, an SLSS may be transmitted on a selected synchronization carrier from Set-B. (A UE may be configured as a non-synchronization carrier by defining the location of the SLSS resources, and configuring the UE to not transmit SLSS on that carrier.) As a second option, an SLSS may be transmitted on all carriers from Set-B. For UE SLSS transmission in the case of limited TX capabilities, the determination of which synchronization carrier(s) from Set B the UE is to transmit SLSS on is left to UE implementation. Each of the first option and the second option may be an independent UE capability.

In some embodiments, synchronization carrier re-selection when synchronization is lost may be left to UE implementation.

Resource Selection

In some embodiments, multicarrier operation in LTE V2X may involve resource selection.

In some embodiments, limited TX capability means that the UE cannot support transmission(s) over a certain number or combination of carriers in a subframe due to one or more of the following reasons. (TX is an acronym for Transmit or Transmission.)

(a) The number of TX chains in the UE may be smaller than the number of configured TX carriers.
(b) The UE does not support the given band combination.
(c) The TX chain switching time is too large, e.g., to meet latency requirement a data packet.
(d) The UE cannot fulfill the RF requirement due to, e.g., PSD imbalance. (PSD is an acronym for Power Spectral Density.)

In some embodiments, for a UE with limited TX capability, the UE may employ one or more of the following options for resource selection in mode 4 CA.

As a first option, when the UE performs the resource selection for a certain carrier, any subframe of that carrier may (or shall) be excluded from the reported candidate resource set if using that subframe exceeds its TX capability limitation under the given resource reservation in the other carriers.

As a second option, if the per-carrier independent resource selection leads to transmissions beyond the TX capability of the UE in a subframe, the UE may perform resource reselection (one or more times) within the given reported candidate resource set until the resultant transmission resources can be supported by the UE.

In some embodiments, when random selection is configured by one or more upper layers (e.g., by the MAC layer), resources within a selection window of a resource pool are considered as the candidate resource set. When random selection is configured by upper layers, for (a), (b), (c), the first option may be applied; otherwise, the second option may be applied.

Format of Physical Sidelink Feedback Channel (PSFCH)

In some embodiments, the PSFCH may employ a sequence-based short format. For example, the PSFCH may employ the sequence of the PUCCH format 0 defined in 3GPP Technical Specification (TS) 28.211.

In some embodiments, the time resources of the PSFCH may be arranged as follows. The PSFCH format may be repeated to two consecutive symbols, i.e., one copy of the PSFCH is transmitted in each of the two consecutive symbols. The first symbol may be used for AGC training at the RX UE. (AGC is an acronym for automatic gain control.) One symbol immediately after the PSFCH transmission(s) may be used for a gap (to enable RF hardware of a UE to switch from transmission to reception, or vice versa).

In some embodiments, the PSFCH may occupy one Physical Resource Block (PRB) in the frequency domain. The PSFCH preferably does not occupy a whole sub-channel, in some embodiments. In other embodiments, the PSFCH may occupy more than one Physical Resource Block (PRB) in the frequency domain, and/or, the PSFCH may occupy a whole sub-channel (or more than one sub-channel).

In some embodiments, each PSFCH is mapped to a corresponding time resource, frequency resource and code resource. In one embodiment, the slot offset of PSFCH transmission from a corresponding PSSCH may be 2 or 3. However, in other embodiments, a wide variety of values (or value sets) are contemplated for the slot offset.

In some embodiments, the time domain resource used for a PSFCH transmission may be based on resource pool (pre)configuration.

In some embodiments, the frequency domain resource used for a PSFCH transmission may be determined by the corresponding PSSCH starting sub-channel index and slot index.

In some embodiments, code domain resource is explored for groupcast HARQ feedback Option 2. A resource for HARQ feedback may be three dimensional in nature, i.e, including a time domain extent, frequency domain extent and a code. Thus, a plurality of feedback messages may be conveyed within a given combination of time resource and frequency resource, using a corresponding plurality of codes.

Sidelink HARQ Transmissions in the Sidelink CA

In some embodiments, we are interested in mechanisms to support sidelink HARQ transmissions in the context of sidelink carrier aggregation (CA). Those mechanisms may address one or more issues such as the aggregation of carriers, resource selection, joint HARQ feedback, and HARQ feedback on the sideline shared channel.

Restrictions of Aggregated Carriers

In some embodiments, for sidelink carrier aggregation, all the component carriers (or alternatively, a subset of the carriers) may be required to have the same PSFCH configuration. For example, if the resource pool on one carrier has PSFCH resources in a given slot, then the resource pools of all other carriers may be required to have PSFCH resources in that slot. In particular, the PSFCH may be required to have the same periodicity and PSFCH slots across all aggregated carriers.

In some embodiments, if two carriers do not have same PSFCH configuration, the UE may not allow those carriers to be aggregated, i.e., to be included in an aggregated set of carriers to be used for sidelink transmission or reception.

Figure 8A:
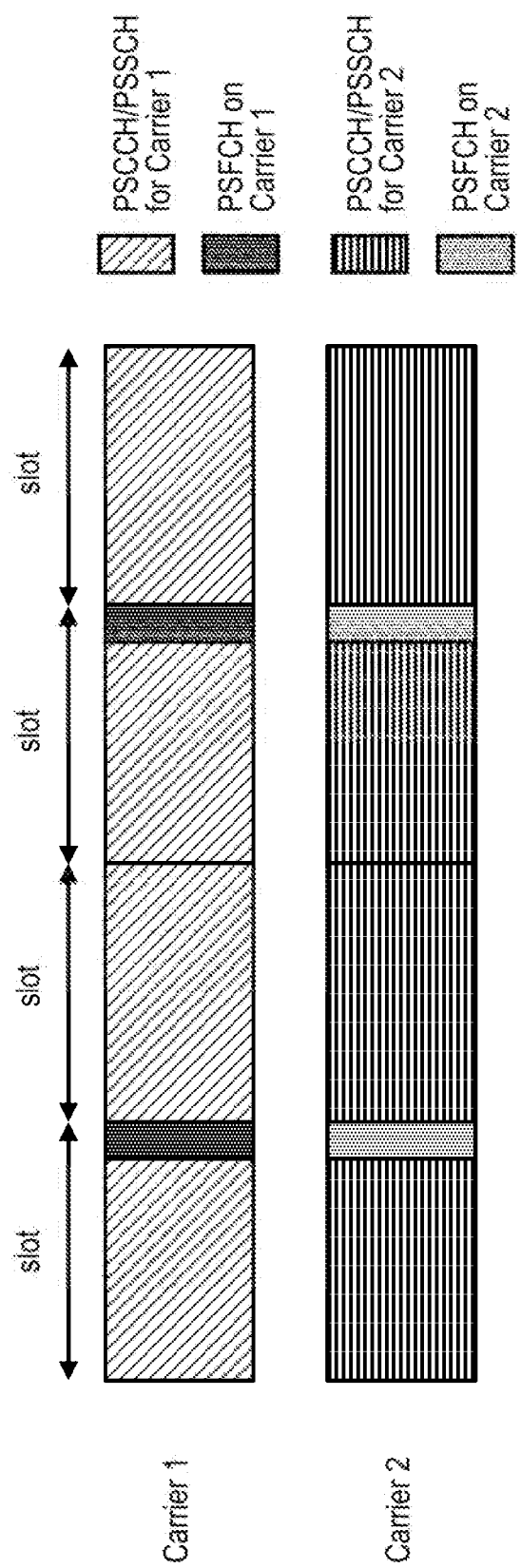
FIG. 8A illustrates an example of the aggregation of two sidelink carriers, denoted Carrier 1 and Carrier 2, having the same Physical Sidelink Feedback Channel (PSFCH) configuration, according to some embodiments.

FIG. 8A illustrates an example of the aggregation of two sidelink carriers, denoted Carrier 1 and Carrier 2, having the same PSFCH configuration, according to some embodiments. Each slot includes a plurality of symbols, e.g., OFDM symbols or Single Carrier—Frequency Divisional Multiple Access (SC-FDMA) symbols. Data packets, e.g., transport blocks, may be transmitted from a first UE to a second UE on the PSSCHs. Control information may be transmitted from the first UE to the second UE on PSCCHs. Control information may also be transmitted from the first UE to the second UE within the PSSCHs. HARQ feedback information may be transmitted from the second UE to the first UE on the PSFCHs, e.g., HARQ feedback indications (e.g., bits) corresponding respectively to the transport blocks. A HARQ feedback indication may indicate whether the corresponding transport block was successfully received by the second UE. (It should be noted that, at least in some embodiments, a slot may include guard intervals or symbols before and/or after a PSFCH, e.g., to enable sufficient time for switching between transmit and receive.) In some embodiments, the time-frequency positions of PSCCHs, PSCCHs and PSFCHs within slots may be consistent with the specifications established by 3GPP 5G New Radio.

In one set of embodiments, a method 800 for operating an apparatus may include the operations shown in FIG. 8B. (The method 800 may also include any subset of the features, elements or operations described above in connection with FIGS. 1-8A, and described below in connection with FIGS. 9A-15.) The method 800 may be performed by processing circuitry, e.g., by the processing element 610 of user equipment 600.

At shown at 810, the processing circuitry may be configured to cause a user equipment (UE) device to determine a set (denoted ScA) of two or more carriers on which to perform sidelink carrier aggregation. The set may be determined so that all of the two or more carriers in the set have the same Physical Sidelink Feedback Channel (PSFCH) configuration. For example, the processing circuity may initiate the set ScA with a first carrier selected from a set SCAND of candidate carriers. (The first carrier may be selected on the basis of one or more criteria such as channel quality, Channel Busy Ratio (CBR), etc.) The processing circuity may then select a second carrier from the set SCA, e.g., again based on the one or more criteria, and add the second carrier to the set SCA only if the PSFCH configuration of the second carrier agrees with the PSFCH configuration of the first carrier.

In some embodiments, the PSFCH configuration includes a PSFCH periodicity and/or a PSFCH slot offset. The PSFCH slot offset may be defined in reference to a common starting sidelink slot over multiple carriers. For example, consider the situation where 2 carriers have the same PSFCH periodicity of one PSFCH every 2 slots, but carrier 1 has the PSFCH transmission configured for slots 1, 3, 5, 7 . . . , and carrier 2 has PSFCH transmission configured for slots 2, 4, 6, 8 . . . . Then these two carriers cannot be used (at least in the presently discussed embodiments) since their PSFCHs occur at different slots, though they have the same PSFCH periodicity.

In some embodiments, the above described action of determining the set SCA includes excluding a candidate carrier from the set in response to determining that the candidate carrier has a PSFCH configuration different from the PSFCH configuration of a first carrier included in the set.

In some embodiments, in response to receiving (e.g., simultaneously receiving) data packets on the two or more carriers of the set SCA, the processing circuitry may be further configured to transmit (e.g., simultaneously transmit) two or more PSFCHs via the two or more carriers of said set, where the two or more PSFCHs include Hybrid Automatic Repeat Request (HARQ) feedback for the data packets received on the two or more carriers. The PSFCH transmitted on each carrier may include HARQ feedback for the data packet received on that carrier. (However, in alternative embodiments, it is possible for the feedback to be transmitted on a different carrier.)

In some embodiments, in response to transmitting data packets on the two or more carriers of the set, the processing circuitry may be further configured to receive two or more PSFCHs via the two or more carriers of said set, where the two or more PSFCHs include Hybrid Automatic Repeat Request (HARQ) feedback for the data packets transmitted on the two or more carriers. The PSFCH received on each carrier may include HARQ feedback for the data packet transmitted on that carrier. (However, in alternative embodiments, it is possible for the feedback to be transmitted on a different carrier.)

Restrictions on Resource Selection

In some embodiments, the UE (or the network) may impose one or more restrictions on the selection of resources within aggregated carriers. For the sake of the present discussion of resource selection, we may assume there is no restriction on carrier selection for carrier aggregation. (However, more generally, the UE might or not might not restrict carrier selection for carrier aggregation.)

In some embodiments, the configuration of PSFCH resources may be different over different carriers.

In some embodiments, when a UE performs the resource selection for a carrier, any slot of that carrier may (or shall) be excluded from the candidate resource set if using that slot would exceed its TX capability limitation under the given resource reservation in the other carriers. (A candidate resource set may be transferred by a UE's physical layer to the UE's MAC layer. The MAC layer may trigger the physical layer to perform the resource selection operation.)

The phrase "using that slot" includes using it for the transmission of PSFCH. For example, if the UE has scheduled PSFCH transmission in a slot of carrier 1, then UE may refrain from selecting resources on this slot in carrier 2 if the TX capability limitation has already been reached (e.g., the UE can only make one transmission, either PSFCH or PSCCH/PSSCH, at a given time).

In some embodiments, when a UE performs the resource selection for a carrier, any slot of that carrier may (or shall) be excluded from the candidate resource set if using that slot would violate the half-duplex constraint(s), including, using the slot for PSFCH reception. For example, if a UE has scheduled PSFCH reception in a slot of carrier 1, then the UE may refrain from selecting resources (for transmission) on this slot in carrier 2, since that selection would violate the half-duplex constraint(s).

In some embodiments, per-carrier independent resource selection may be performed by the UE. If the per-carrier independent resource selection leads to a selection of resources that would exceed the TX capability of the UE in a subframe or leads to a violation of the half-duplex constraint(s), the UE may perform resource reselection (one or more times) within the given reported candidate resource set, until the resultant transmission resources can be supported by the UE, i.e., fall within the TX capability and satisfy the half duplex constraint(s).

Figure 9A:
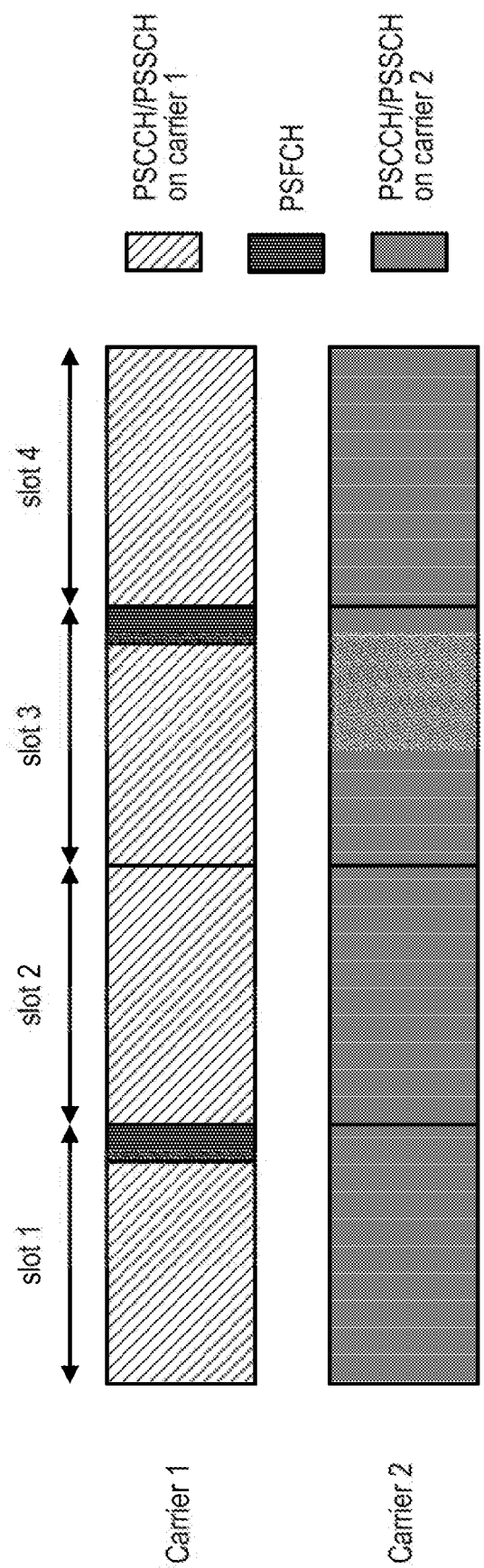
FIG. 9A illustrates an example of the aggregation of two carriers, Carrier 1 and Carrier 2, where only one of the carriers (e.g., Carrier 1) is allowed to carry a PSFCH, e.g., due transmit capability limitation and/or half duplex constraint, according to some embodiments.

FIG. 9A illustrates an example of the aggregation of two carriers, Carrier 1 and Carrier 2, where only one of the carriers (e.g., Carrier 1) is allowed to carry a PSFCH, e.g., due transmit capability limitation and/or half duplex constraint, according to some embodiments.

Figure 9B:
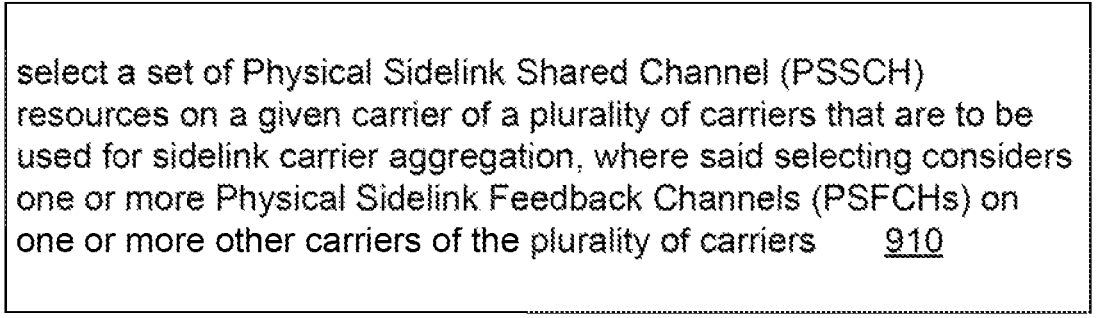
FIG. 9B illustrates a method for selecting a set of Physical Sidelink Shared Channel (PSSCH) resources on a given carrier of a plurality of carriers that are to be used for sidelink carrier aggregation, according to some embodiments.

In one set of embodiments, a method 900 for operating an apparatus may include the operations shown in FIG. 9B. (The method 900 may also include any subset of the features, elements or operations described above in connection with FIGS. 1-9A, and described below in connection with FIGS. 10-15.) The method 900 may be performed by processing circuitry, e.g., by the processing element 610 of user equipment 600.

As shown at 910, the processing circuitry may be configured to cause a user equipment (UE) device to select a set X of Physical Sidelink Shared Channel (PSSCH) resources on a given carrier of a plurality of carriers that are to be used for sidelink carrier aggregation, where said selecting considers one or more Physical Sidelink Feedback Channels (PSFCHs) on one or more other carriers of the plurality of carriers. (The resource selection selects PSSCH resources rather than PSFCH resources. The PSFCH resources are determined when the corresponding PSSCH resources are determined. The selection of PSSCH resources takes into account the already scheduled PSFCH resources corresponding to different PSSCH resources). For example, in connection with FIG. 9A, suppose that a UE has already decided upon an early PSSCH transmission (for data 1), whose corresponding HARQ feedback is in slot 1 of carrier 1. Thus, the UE will need to receive a PSFCH in slot 1 of carrier 1. Further suppose that the UE has data 2 for transmission. Under half-duplex constraints, the UE may refrain from selecting slot 1 of carrier 2. (If the UE were to select slot 1 of carrier 2 for transmission of data 2, then it would have to receive PSFCH on carrier 1 and transmit PSSCH on carrier 2, both in the slot 1, contrary to the half-duplex constraints.)

In some embodiments, the above described action of selecting the set X may include excluding from the set X a slot (or other unit of time) of the given carrier in response to a determination that using that slot would exceed a transmit capability limitation of the UE device under an existing resource reservation (i.e., a reservation of resources already belonging to the set) on one or more other carriers.

In some embodiments, the above described action of selecting the set X may include excluding from the set a slot (or other unit of time) of the given carrier in response to a determination that using that slot would violate a half duplex constraint of the UE device. For example, the slot in the given carrier may be a slot to be used for transmission while an existing resource reservation on the one or more other carriers is for reception.

In some embodiments, above described action of selecting the set X may include: (a) performing independent resource selection per carrier to initialize the set X; and (b) performing resource re-selection one or more times on the set X to resolve (or remove) violations of a transmit capability limitation and/or violations of a half duplex constraint. Each iteration of re-selection may result in a decrease in the size of the set. Thus, in successive iterations the set evolves as a descending chain of subsets:

$$X_0 \supset X_1 \supset \ldots \supset X_{Nf-1} \supset X_{Nf},$$

wherein $X_{Nf}$ is the final state of the set X.

In some embodiments, the above described action of selecting PSSCH resources may be repeated for each carrier of said plurality of carriers, or for each carrier (of said plurality) except for an initial carrier of said plurality, for which initial carrier there are, by definition, no PSSCH resource reservations on previous carriers.

In some embodiments, the processing circuitry may be configured to cause a user equipment (UE) device to transmit a data packet on the given carrier in a first slot, using at least a portion of the selected set of PSSCH resources; and receive Hybrid Automatic Repeat Request (HARQ) feedback using a second slot on the given carrier, wherein the second slot occurs after the first slot.

In some embodiments, the processing circuitry may be configured to cause a user equipment (UE) device to, as a result of said selecting, refrain from transmitting a data packet in a first slot on the given carrier, and receive a HARQ feedback message (from a second UE device) in the first slot on one of the one or more other carriers.

Joint Sidelink HARQ Feedback

In some embodiments, the UE may aggregate the HARQ feedback from a plurality of carriers, and transmit it as a joint sidelink HARQ feedback on one carrier. This joint transmission avoids the transmission of multiple PSFCHs simultaneously, which may exceed the UE's transmission capability. (In some embodiments, the UE's transmit capability is not as great as the UE's reception capability. For example, the UE may be able to simultaneously receive on $N_{RX}$ receive chains and simultaneously transmit on $N_{TX}$ transmit chains, with $N_{RX} > N_{TX}$.) Thus, the UE may transmit a single PSFCH on a single carrier of an aggregated set of carriers, with the single PSFCH carrying the joint HARQ feedback for the aggregated set of carriers (or a subset of the aggregated set).

In some embodiments, the TX UE may determine which carrier is to carry the PSFCH using any of various mechanisms. For example, the carrier which is to carry the PSFCH may be pre-determined, e.g., as the carrier with the smallest or the largest carrier index, or, as the carrier with the smallest or the largest index among those that have PSFCH resources. (Some carriers might not have configured PSFCH resources.)

Alternatively, the carrier which is to carry the PSFCH may be dynamically indicated by the TX UE in Sidelink Control Information (SCI). For example, SCI (e.g., stage 2 SCI) transmitted on a carrier may include an indicator to show whether or not sidelink HARQ feedback is to be transmitted in the carrier. As another example, SCI (e.g., stage 2 SCI) may indicate which carrier (e.g., which carrier in a candidate set of carriers, or which carrier in an aggregate set of carriers, or which carrier possibly in an aggregated set of carriers) is to transmit sidelink HARQ feedback (or, is allowed to transmit sidelink HARQ feedback).

As another alternative, the carrier which is to carry the PSFCH may be based on configuration, e.g., based on the resource pool configuration. A base station of a network to which the UE is subscribed may transmit resource pool configuration information for each carrier to be aggregated, or each carrier in a candidate set of carriers. Alternatively, the resource pool may be pre-configured, e.g., by a device manufacturer. The term "pre-configured" implies a configuration without network involvement. (The resource pool in each carrier is a pool of resources on which the UE is allowed to perform side link transmission and/or reception.)

In some embodiments, for each carrier, the configuration information for the resource pool of that carrier may include an indication of the carrier priority of any sidelink HARQ to be transmitted on that carrier. In other embodiments, the carrier which is to carry the PSFCH may be based on PC5-RRC configuration. (PC5 is an interface for sidelink communication between UE devices. RRC is an acronym for Radio Resource Control.) A pair of UEs may configure, e.g., using a sidelink interface such as PC5, which carrier is to carry the sidelink HARQ feedback.

Figure 10:
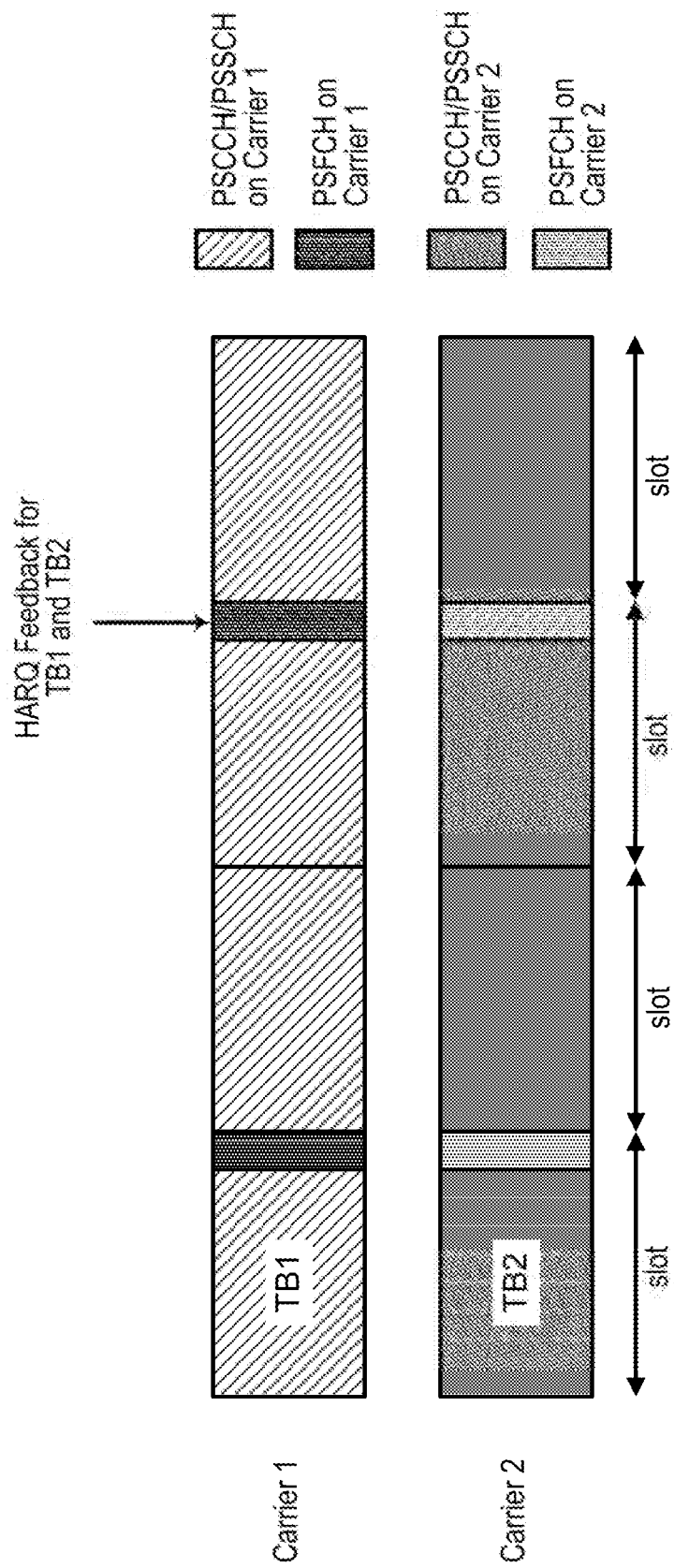
FIG. 10 illustrates an example of the transmission of joint HARQ feedback for a plurality of carriers on a single carrier (e.g., carrier 1), according to some embodiments.

FIG. 10 illustrates an example of the transmission of joint HARQ feedback on a single carrier (e.g., carrier 1), according to some embodiments. The joint HARQ feedback is transmitted in a PSFCH on carrier 1, and includes feedback information for transport blocks TB1 and TB2, which are transmitted respectively on carriers 1 and 2. Thus, in this example, the PSFCH resource shown on carrier 2 is not used. (However, it is possible that the PSFCH resource on carrier 2 may be used for feedback transmission by another UE.)

In some embodiments, if the total payload of the HARQ feedback is 2 bits, then the UE may reuse an existing PSFCH format to transmit (or receive) the HARQ feedback, e.g., an existing format of PSFCH in 3GPP Technical Specification (TS) 38.211.

In some embodiments, cyclic shift may be applied to the PSFCH to encode the HARQ feedback. In one embodiment, four values of cyclic shift $m_{cs}$ may be used to indicate the 4 possible states of the 2-bit HARQ feedback. For example, in one embodiment, $m_{cs}=0$ implies the state (0,0); $m_{cs}=3$ implies the state (0,1); $m_{cs}=6$ implies the state (1,0); and $m_{cs}=9$ implies the state (1,1).

In some embodiments, if the total payload of the HARQ feedback is more than 2 bits, the UE may employ a sidelink HARQ-ACK codebook to transmit (or receive) the HARQ feedback.

In some embodiments, a semi-static (Type 1) codebook may be employed, e.g., a semi-static sidelink HARQ-ACK codebook.

According to the Type 1 codebook, HARQ-ACK bits may be arranged in a feedback message (to be transmitted in a PSFCH) in a defined order relative to carrier index and slot index. For example, the HARQ-ACK bits may be arranged according to a "carrier index first and slot second" rule, or alternatively, according to a "slot first and carrier index second" rule. All the component carriers of an aggregated set of carriers may be considered. If there is no PSCCH/PSSCH transmission on a carrier in a slot, then the default value may be NACK (or zero) for the corresponding bit in the feedback message. For example, HARQ bits may be placed in the feedback message according to the order $(FB_{TB1}, FB_{TB2}, FB_{TB3}, FB_{TB4}, FB_{TB5}, FB_{TB6})$ where $FB_{TBx}$ denotes the feedback bit for transport block x.

Figure 11:
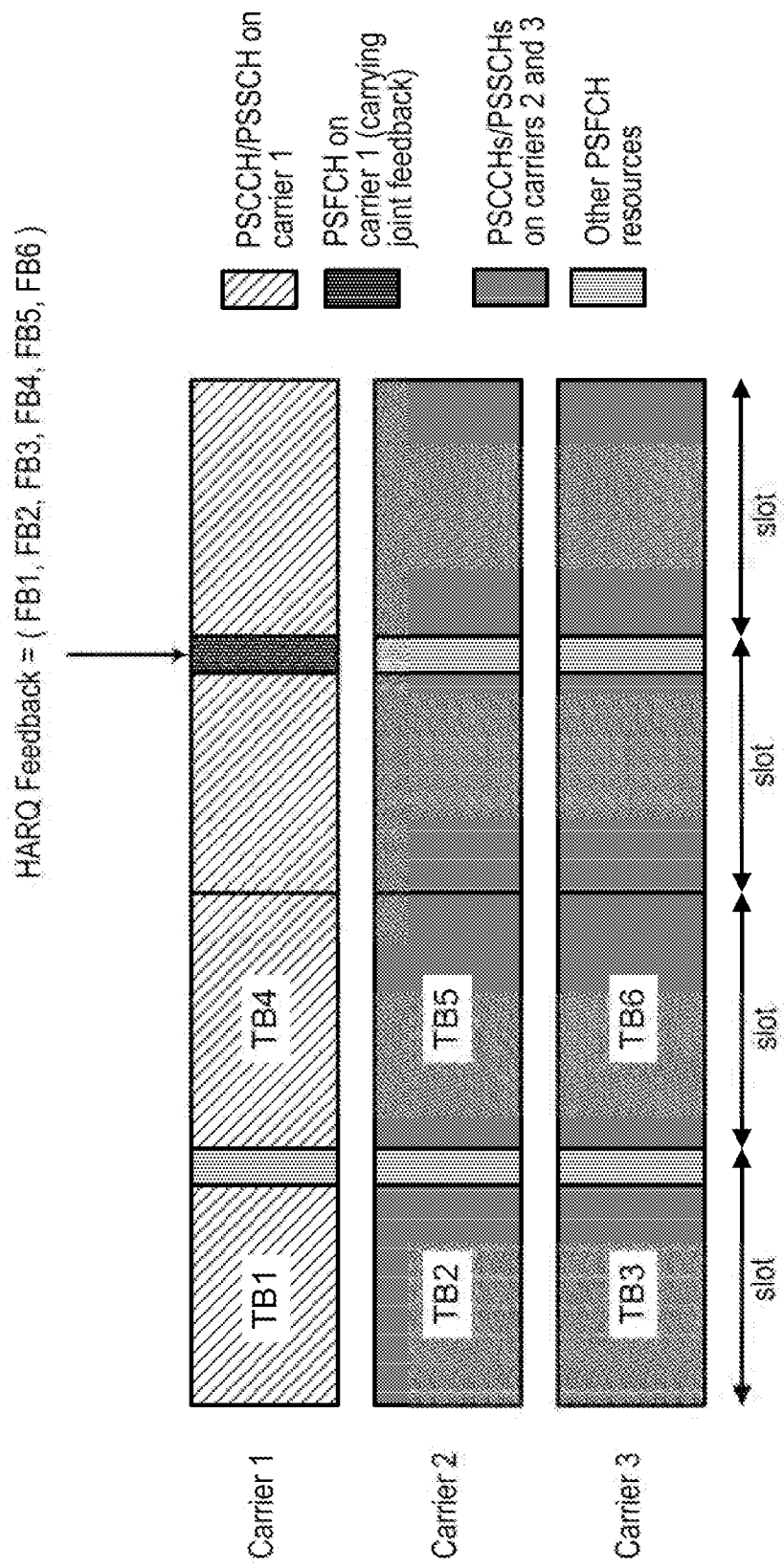
FIG. 11 illustrates an example of the transmission of joint HARQ feedback on the PSFCH of a single carrier (e.g., carrier 1) of an aggregated set of carriers (including carriers 1, 2 and 3), according to some embodiments.
Figure 12:
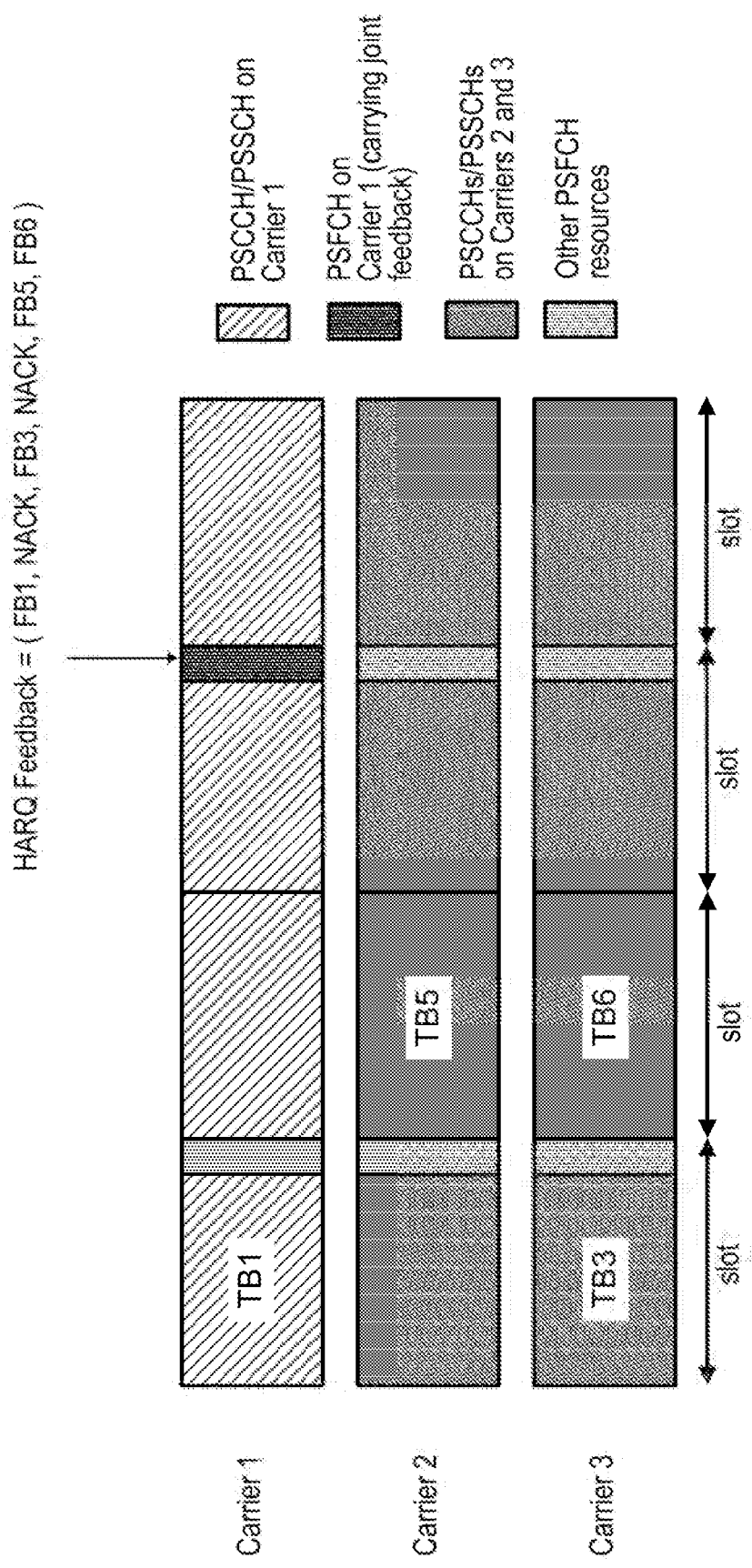
FIG. 12 illustrates an example similar to that of FIG. 11, with the exception that negative acknowledgement (NACK) indications are injected for feedback positions corresponding to carrier-slot combinations with no data transmission, according to some embodiments.

FIG. 11 illustrates an example of the transmission of joint HARQ feedback on the PSFCH of a single carrier (carrier 1) of an aggregated set of carriers (including carriers 1, 2 and 3), according to some embodiments. The joint HARQ feedback is transmitted on the PSFCH resource in the third illustrated slot on carrier 1, and includes feedback bits for respective transport blocks TB1-TB6, which have been transmitted on carriers 1, 2 and 3 as shown. (The other PSFCH resources shown in FIG. 11 may be unused, or perhaps used for feedback by other UEs.) The feedback bits are transmitted according to an ordering characterized by the rule, "carrier first and slot second". FIG. 12 illustrates a similar example, except for NACK indications being injected for the feedback positions corresponding to carrier-slot combinations with no TB transmission, according to some embodiments. It should be understood that the examples shown in these figures are illustrated in nature, and that a wide variety of other choices may be made for values such as the feedback bearing carrier, the number of aggregated carriers, the number of transport blocks to be considered for joint feedback, etc.

In some embodiments, a UE may employ a dynamic (Type 2) sidelink HARQ-ACK codebook for transmission and/or reception of HARQ-ACK feedback. The SCI for a transport block may contain a total sidelink assignment index (T-SAI) field and a counter sidelink assignment index (C-SAI) field. (These fields may be contained in stage 2 SCI. In some embodiments, these fields may be 2-bit fields. However, a wide variety of field sizes are contemplated. In some embodiments, these fields are of configurable field size.) For each transport block transmitted by a transmit UE, the corresponding T-SAI field may indicate the total number of feedback bits for the feedback message to be transmitted by the receive UE, and the corresponding C-SAI field may indicate the position of the feedback bit (in the feedback message) for the transport block.

For example, to define the dynamic codebook whose message format vector is $FB_{TB1}, FB_{TB3}, FB_{TB5}, FB_{TB6}$), a TX UE may transmit SCIs so that: the SCI for TB1 includes T-SAI=4 and C-SAI=0; the SCI for TB3 includes T-SAI=4 and C-SAI=1; the SCI for TB5 includes T-SAI=4 and C-SAI=2; and the SCI for TB6 includes T-SAI=4 and C-SAI=3. (Note that TB2 and TB4 are not transmitted in this example. Thus, the corresponding SCI does not exist.)

In some embodiments, the determination of whether a Type 1 or Type 2 sidelink HARQ-ACK codebook is to be used may be based on configurations, e.g., resource pool configuration or PC5-RRC configuration.

Figure 13:
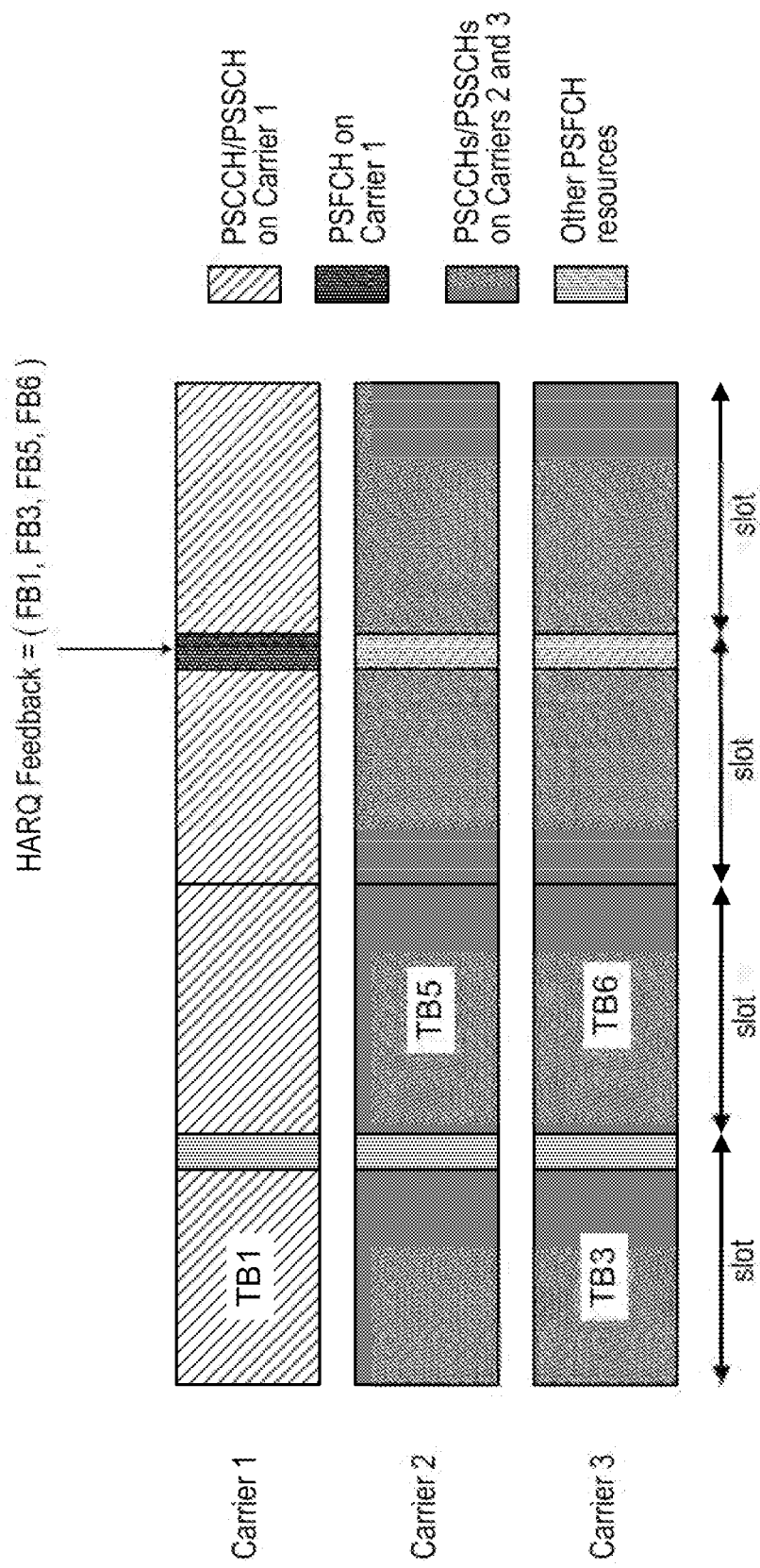
FIG. 13 illustrates an example of the use of a dynamically configured HARQ-ACK codebook to transmit joint HARQ-ACK feedback, according to some embodiments.

FIG. 13 illustrates the use of a dynamically configured HARQ-ACK codebook to transmit joint HARQ-ACK feedback, according to some embodiments. According to the implied dynamic HARQ-ACK codebook, the HARQ-ACK feedback message includes bit positions for four transport blocks as shown. Bit positions are not needed for (Carrier 2, Slot 1) and (Carrier 1, Slot 2) since those Carrier-Slot combinations do not include TB transmissions.

In some embodiments, a PSFCH format that carries more than 2 bits may be employed. (This PSFCH format may use the design of PUCCH format 2, or not.) In some embodiments, resources of this PSFCH format, which may be referred to herein as "PSFCH format 1", may have one or more of the following properties. In the time-domain, the gap between PSFCH and the corresponding PSCCH/PSSCH may be configured per resource pool (or per carrier). The gap may be included as part of resource pool configuration. The UE may receive resource pool configuration from a base station. Alternatively, the resource pool configuration may be pre-configured in memory, e.g., by a device manufacturer. The configuration for PSFCH format 1 may be the same as or different from configuration for PSFCH format 0. In PSFCH format 1, the PSFCH may be included in the last 2 symbols of a slot, just like legacy PSFCH format 0.

In the frequency-domain, the PSFCH of format 1 may be frequency domain multiplexed (FDMed) with a PSFCH of format 0. In some embodiments, each PSFCH of format 1 occupies a plurality of consecutive RBs. The frequency resources for a PSFCH of format 1 may be configured per resource pool. (The resource pool configuration may be received from a base station. Alternatively, the resource pool configuration may be pre-configured in memory of the UE, e.g., by a device manufacturer.) The PSFCH configuration information may indicate the number of RBs occupied by each resource; and which RBs are allocated to PSFCH format 1 in a resource pool.

There may be an association between the resource used by the PSFCH of format 1 and the resource of the PSCCH/PSSCH. For example, the frequency-domain resource and/or code-domain resource of the PSFCH may be determined based on the PSCCH/PSSCH resource location, the source ID of layer 1 of the TX UE, etc. (The TX UE may transmit more than one layer of data on the PSSCH.)

In some embodiments, the PSFCH of format 1 may be scrambled, e.g., using a Gold sequence. The initialization value of the scrambling sequence may depend on source ID and/or destination ID. The source ID is the transmit UE's ID, and the destination ID is the receive UE's ID. These IDs may be physical layer (L1) IDs or MAC layer (L2) IDs.

In some embodiments, when a UE transmits on a plurality of a carriers, the PSFCH may have a determined (or pre-determined) priority relative to UL transmission (to a network) and SL transmission or reception to/from other UE(s). The priority of a PSFCH may be equal to the highest of the priorities of the data transmitted over the carriers.

Figure 14:
FIG. 14 illustrates a method for transmitting joint HARQ feedback for a plurality of carriers on a PSFCH resource in a selected carrier of the plurality of carriers, according to some embodiments.

In one set of embodiments, a method 1400 for operating an apparatus may include the operations shown in FIG. 14. (The method 1400 may also include any subset of the features, elements or operations described above in connection with FIGS. 1-13, and described below in connection with FIG. 15.) The method 1400 may be performed by processing circuitry, e.g., by the processing element 610 of user equipment 600.

As shown at 1410, the processing circuitry may be configured to cause a user equipment (UE) device to transmit joint HARQ feedback for a plurality of carriers on a Physical Sidelink Feedback Channel (PSFCH) in a selected carrier of the plurality of carriers.

In some embodiments, the selected carrier that is to carry the joint HARQ feedback may be a pre-determined one of the carriers of said plurality, e.g., as variously described above.

In some embodiments, the processing circuitry may be configured to cause a user equipment (UE) device to transmit sidelink control information (SCI) in one of the carriers, where the SCI includes a dynamic indication of whether that carrier is the selected carrier that includes the joint HARQ feedback.

In some embodiments, the processing circuitry may be configured to cause a user equipment (UE) device to transmit sidelink control information (SCI) including a dynamic indication of the selected carrier that is to carry the joint HARQ feedback.

In some embodiments, the selected carrier that carries the joint HARQ feedback may be the carrier of said plurality that has the highest priority according to a priority defined as part of a resource pool configuration, e.g., as variously described above.

In some embodiments, the selected carrier that carries the joint HARQ feedback may be determined by the UE device and a second UE device as part of a configuration process (e.g., an RRC configuration process) conducted via a sidelink interface. RRC is an acronym for Radio Resource Control.

In some embodiments, the joint HARQ feedback may be encoded (or represented) by choice of a cyclic shift for the PSFCH, e.g., as variously described above.

In some embodiments, the joint HARQ feedback may be transmitted using a HARQ-ACK codebook, e.g., a semi-static codebook or a dynamic codebook, as variously described above.

In some embodiments, the HARQ-ACK codebook may be a semi-statically configured codebook, where bits of the joint HARQ feedback are ordered according to a rule that uses slot first and carrier index second.

In some embodiments, the HARQ-ACK codebook may be a semi-statically configured codebook, where bits of the joint HARQ feedback are ordered according to a rule that uses carrier index first and slot second.

In some embodiments, the processing circuitry may be configured to cause a user equipment (UE) device to transmit sidelink control information (SCI) that dynamically indicates the selected carrier that is to carry the joint HARQ feedback.

In some embodiments, the joint HARQ feedback may include more than 2 payload bits. In these embodiments, the PSFCH uses the channel design of PUCCH format 2.

In some embodiments, a time gap between PSFCH and PSCCH and/or PSSCH may be configured (e.g., by a base station of a wireless communication network) per resource pool.

In some embodiments, the PSFCH may be transmitted in the last two symbols of a slot (or the last two symbols immediately preceding a gap symbol that occurs at the end of the slot).

In some embodiments, the PSFCH may be frequency domain multiplexed with a second PSFCH, where the second PSFCH is of PSFCH format 0.

In some embodiments, the PSFCH may occupy a plurality of consecutive resource blocks in the frequency domain. In other embodiments, the PSFCH occupies a single resource block in the frequency domain.

In some embodiments, frequency domain resources used for transmissions of PSFCHs may be configured per resource pool.

In some embodiments, a frequency domain resource and/or a code domain resource used for transmission of the PSFCH may be determined based at least on a resource location of a corresponding PSCCH or a corresponding PSSCH.

In some embodiments, the PSFCH may be scrambled (by the UE prior to transmission) with a scrambling sequence whose initialization value depends on a source ID and/or a destination ID.

In some embodiments, a priority of the PSFCH relative to uplink transmission and/or SL communication may be determined based on a highest of priorities of data blocks whose feedback bits are included in the joint HARQ feedback.

Sidelink HAW) Feedback Transmissions on PSSCH

In some embodiments, sidelink HARQ feedback may be transmitted on the PSSCH (Physical Side link Shared Channel). The resources used for the sidelink HARQ feedback on the PSSCH may be defined as follows. The SCI (sidelink control information) corresponding to a PSSCH may contain an offset field (which might be referred as a "beta offset") to indicate the location of the resources within the PSSCH, i.e., the resources used for sidelink HARQ feedback. This offset field may be included either in SCI stage 1 or SCI stage 2. (SCI stage 1 is transmitted in the PSCCH while SCI stage 2 is transmitted in the PSSCH.)

In some embodiments, to trigger the transmission of sidelink HARQ feedback on the PSSCH, one or more of the following conditions may be applied. As a first condition, the RX UE may determine, when it has sidelink HARQ feedback to be transmitted to a TX UE, whether it also has sidelink data to send to the TX UE. The PSSCH resource may be required to be within the time limit of the corresponding PSFCH transmission time. As a second condition, the RX UE may determine whether the TX UE has required (or requested) feedback transmission on the PSSCH. As a third condition, the RX UE may determine, when it has sidelink HARQ feedback to be transmitted to a TX UE, whether a payload size of the sidelink HARQ feedback is larger than a configured threshold. (The threshold may be configured by the network, e.g., via resource pool configuration; may be pre-configured; or may configured between two UEs without network involvement.) If the one or more triggering conditions are satisfied, the RX UE may transmit the sidelink HARQ feedback on the PSSCH.

Figure 15:
FIG. 15 illustrates a method for transmitting HARQ feedback on a Physical Sidelink Shared Channel (PSSCH), according to some embodiments.

In one set of embodiments, a method 1500 for operating an apparatus may include the operations shown in FIG. 15. (The method 1500 may also include any subset of the features, elements or operations described above in connection with FIGS. 1-14.) The method 1500 may be performed by processing circuitry, e.g., by the processing element 610 of user equipment 600.

As shown at 1510, the processing circuitry may transmit HARQ feedback on a Physical Sidelink Shared Channel (PSSCH).

In some embodiments, the processing circuitry may be configured to cause a user equipment (UE) device to transmit sidelink control information (SCI) corresponding to the PSSCH, where the SCI includes an offset field. The offset field may indicate resources of the PSSCH, used to carry the HARQ feedback.

In some embodiments, the SCI may be stage 1 SCI or stage 2 SCI. Stage 1 SCI is transmitted in a Physical Sidelink Control Channel (PSCCH). Stage 2 SCI is transmitted in the PSSCH.

In some embodiments, said transmission of the HARQ feedback on the PSSCH may be performed in response to a determination that the UE device has sidelink data to send to a second UE whose one or more transmissions caused generation of the HARQ feedback.

In some embodiments, said transmission of the HARQ feedback on the PSSCH may be performed in response to an instruction received from a transmit UE.

In some embodiments, said transmission of the HARQ feedback on the PSSCH may be performed in response to a determination that a payload size of the HARQ feedback is greater than a configured threshold.

In some embodiments, a non-transitory memory medium may store program instructions. The program instructions, when executed by processing circuitry, may cause the processing circuitry to perform any of the method embodiments described above, and any combination of those embodiments. The memory medium may incorporated as part of a base station.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Any of the methods described herein for operating a user equipment (UE) in communication with a base station (or transmission-reception point) may be the basis of a corresponding method for operating a base station (or transmission-reception point), by interpreting each message/signal X received by the UE in the downlink as a message/signal X transmitted by the base station (or transmission-reception point), and each message/signal Y transmitted in the uplink by the UE as a message/signal Y received by the base station (or transmission-reception point).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus comprising processing circuitry, wherein the processing circuitry is configured to cause a user equipment (UE) to:
   transmit joint HARQ feedback for a plurality of carriers on a Physical Sidelink Feedback Channel (PSFCH) in a selected carrier of the plurality of carriers, wherein the selected carrier that carries the joint HARQ feedback is the carrier of said plurality that has the highest priority according to a priority defined as part of the resource pool configuration, and wherein a priority of the PSFCH relative to uplink transmission and/or SL communication is determined based on a highest of priorities of data blocks whose feedback bits are included in the joint HARQ feedback.

2. The apparatus of claim 1,
   wherein the processing circuitry is configured to cause the UE to transmit sidelink control information (SCI);
   wherein the sidelink control information is transmitted in a first of the carriers, wherein the SCI includes a dynamic indication of whether the first carrier is the selected carrier that includes the joint HARQ feedback; or
   wherein the side control information includes a dynamic indication of the selected carrier that is to carry the joint HARQ feedback.

3. The apparatus of claim 1,
   wherein the joint HARQ feedback is encoded by choice of a cyclic shift for the PSFCH; or
   wherein the joint HARQ feedback is transmitted using a HARQ-ACK codebook.

4. The apparatus of claim 3,
   wherein the HARQ-ACK codebook is a semi-statically configured codebook, and wherein bits of the joint HARQ feedback are ordered according to a rule that uses slot first and carrier index second or carrier index first and slot second.

5. The apparatus of claim 3,
   wherein the processing circuitry is configured to cause the UE to transmit sidelink control information (SCI) that dynamically indicates the selected carrier that is to carry the joint HARQ feedback.

6. The apparatus of claim 1,
   wherein the joint HARQ feedback includes more than 2 payload bits, wherein the PSFCH uses a channel design of PUCCH format 2; or
   wherein a time gap between PSFCH and PSCCH and/or PSSCH is configured per resource pool.

7. The apparatus of claim 1,
   wherein the PSFCH is transmitted in a last two symbols of a slot;
   wherein the PSFCH is frequency domain multiplexed with a second PSFCH, and the second PSFCH is of PSFCH format 0; or
   wherein the PSFCH occupies a plurality of consecutive resource blocks in the frequency domain.

8. The apparatus of claim 1,
   wherein frequency domain resources used for transmissions of PSFCHs are configured per resource pool;
   wherein a frequency domain resource and/or a code domain resource used for transmission of the PSFCH is determined based at least on a resource location of a corresponding PSCCH or a corresponding PSSCH; or
   wherein the PSFCH is scrambled with a scrambling sequence whose initialization value depends on a source ID and/or a destination ID.

9. A method, comprising:
   transmitting joint HARQ feedback for a plurality of carriers on a Physical Sidelink Feedback Channel (PSFCH) in a selected carrier of the plurality of carriers, wherein the selected carrier that carries the joint HARQ feedback is the carrier of said plurality that has the highest priority according to a priority defined as part of the resource pool configuration, and wherein a priority of the PSFCH relative to uplink transmission and/or SL communication is determined based on a highest of priorities of data blocks whose feedback bits are included in the joint HARQ feedback.

10. The method of claim 9, further comprising:
    transmitting sidelink control information (SCI); and
    wherein the sidelink control information is transmitted in a first of the carriers, wherein the SCI includes a dynamic indication of whether the first carrier is the selected carrier that includes the joint HARQ feedback; or
    wherein the side control information includes a dynamic indication of the selected carrier that is to carry the joint HARQ feedback.

11. The method of claim 9,
    wherein the joint HARQ feedback is encoded by choice of a cyclic shift for the PSFCH; or
    wherein the joint HARQ feedback is transmitted using a HARQ-ACK codebook, wherein the HARQ-ACK codebook is a semi-statically configured codebook, and wherein bits of the joint HARQ feedback are ordered according to a rule that uses slot first and carrier index second or carrier index first and slot second.

12. The method of claim 11, further comprising:
    transmitting sidelink control information (SCI) that dynamically indicates the selected carrier that is to carry the joint HARQ feedback.

13. The method of claim 9,
    wherein the joint HARQ feedback includes more than 2 payload bits, and wherein the PSFCH uses a channel design of PUCCH format 2.

14. The method of claim 9,
    wherein a time gap between PSFCH and PSCCH and/or PSSCH is configured per resource pool.

15. The method of claim 9,
    wherein the PSFCH is transmitted in a last two symbols of a slot;

wherein the PSFCH is frequency domain multiplexed with a second PSFCH, and the second PSFCH is of PSFCH format 0; or wherein the PSFCH occupies a plurality of consecutive resource blocks in the frequency domain.

16. The method of claim 9, wherein frequency domain resources used for transmissions of PSFCHs are configured per resource pool;

wherein a frequency domain resource and/or a code domain resource used for transmission of the PSFCH is determined based at least on a resource location of a corresponding PSCCH or a corresponding PSSCH; or wherein the PSFCH is scrambled with a scrambling sequence whose initialization value depends on a source ID and/or a destination ID.

17. A non-transitory computer readable memory medium storing program instructions executable by a processor of a device to cause the device to:

transmit joint HARQ feedback for a plurality of carriers on a Physical Sidelink Feedback Channel (PSFCH) in a selected carrier of the plurality of carriers, wherein the selected carrier that carries the joint HARQ feedback is the carrier of said plurality that has the highest priority according to a priority defined as part of the resource pool configuration, and wherein a priority of the PSFCH relative to uplink transmission and/or SL communication is determined based on a highest of priorities of data blocks whose feedback bits are included in the joint HARQ feedback.

18. The non-transitory computer readable memory medium of claim 17, wherein the joint HARQ feedback includes more than 2 payload bits, wherein the PSFCH uses a channel design of PUCCH format 2; or wherein a time gap between PSFCH and PSCCH and/or PSSCH is configured per resource pool.

19. The non-transitory computer readable memory medium of claim 17, wherein the PSFCH is transmitted in a last two symbols of a slot;

wherein the PSFCH is frequency domain multiplexed with a second PSFCH, and the second PSFCH is of PSFCH format 0; or wherein the PSFCH occupies a plurality of consecutive resource blocks in the frequency domain.

20. The non-transitory computer readable memory medium of claim 17, wherein frequency domain resources used for transmissions of PSFCHs are configured per resource pool;

wherein a frequency domain resource and/or a code domain resource used for transmission of the PSFCH is determined based at least on a resource location of a corresponding PSCCH or a corresponding PSSCH; or wherein the PSFCH is scrambled with a scrambling sequence whose initialization value depends on a source ID and/or a destination ID.

* * * * *